United States Patent
Kettler et al.

(10) Patent No.: US 7,156,408 B2
(45) Date of Patent: Jan. 2, 2007

(54) VEHICLE STEERING HEAD

(75) Inventors: Heinz Kettler, Ense-Parsit (DE); Joachim Kettler, Werl (DE); Reinhard Rocholl, Werl (DE)

(73) Assignee: Heinz Kettler GmbH & Co. KG., Ense-Parsit (DE)

( * ) Notice: Subject to any disclaimer, the term of this patent is extended or adjusted under 35 U.S.C. 154(b) by 0 days.

(21) Appl. No.: 10/671,668

(22) Filed: Sep. 29, 2003

(65) Prior Publication Data

US 2004/0090038 A1    May 13, 2004

Related U.S. Application Data

(63) Continuation of application No. 10/298,002, filed on Nov. 18, 2002, now Pat. No. 6,799,772, which is a continuation of application No. 10/092,516, filed on Mar. 8, 2002, now abandoned, which is a continuation of application No. 09/584,497, filed on Jun. 1, 2000, now Pat. No. 6,378,884.

(30) Foreign Application Priority Data

Jul. 5, 1999    (DE) .......................... 299 11 652 U

(51) Int. Cl.
    *B62K 5/02*    (2006.01)
(52) U.S. Cl. .................... 280/279; 280/272; 74/495
(58) Field of Classification Search ............ 280/279, 280/272, 271, 282, 89; 403/354, 83; 74/495
    See application file for complete search history.

(56) References Cited

U.S. PATENT DOCUMENTS

| 227,746 | A | 5/1880 | Fancher |
| 565,718 | A | 8/1896 | Boardman |
| 576,566 | A | 2/1897 | Foehl |
| 579,664 | A | 3/1897 | McConley |
| 582,279 | A | 5/1897 | Gold |
| 591,864 | A | 10/1897 | Meyer |
| 642,269 | A | 1/1900 | Smith |
| 1,279,540 | A | 9/1918 | Hams |
| 1,438,042 | A | 12/1922 | Kincaid |
| 2,027,522 | A | 1/1936 | Eck |
| 2,246,191 | A | 7/1941 | Schmitz |
| 2,415,735 | A | 2/1947 | Fastborg |
| 4,006,915 | A | 2/1977 | Parker |
| 4,029,329 | A | 6/1977 | Chambers |
| 4,120,514 | A | 10/1978 | Sanders |
| 4,138,131 | A | 2/1979 | Sommer |
| 4,261,588 | A | 4/1981 | Kassai |

(Continued)

FOREIGN PATENT DOCUMENTS

CH    290478    4/1953

(Continued)

OTHER PUBLICATIONS

Pages 1 and 2 of a 1998 Radio Flyer catalog.

(Continued)

*Primary Examiner*—Tony Winner
(74) *Attorney, Agent, or Firm*—Greenblum & Bernstein, P.L.C.

(57) ABSTRACT

Vehicle steering head including a connecting element adapted to engage a handlebar. A support tube rotatably supports the connecting element. A connecting member is adapted to connect a wheel fork to a handlebar. The connecting member is rotatable with respect to the support tube. A mechanism limits the rotational movement of the connecting member in each of two directions. A lower bearing support is mounted to the support tube. The mechanism and the lower bearing support cooperate to limit the rotational movement of the connecting member.

71 Claims, 9 Drawing Sheets

U.S. PATENT DOCUMENTS

| | | | |
|---|---|---|---|
| D278,325 S | 4/1985 | Nagel | |
| 4,608,729 A | 9/1986 | Huang | |
| 4,624,470 A | 11/1986 | Love | |
| 4,674,761 A | 6/1987 | Kassai | |
| 4,714,261 A | 12/1987 | Kassai | |
| 4,744,575 A | 5/1988 | Tonelli | |
| 4,887,827 A | 12/1989 | Heggie | |
| 5,272,936 A | 12/1993 | Nagano | |
| 5,279,181 A | 1/1994 | Boudreau | |
| 5,291,797 A | 3/1994 | Chi | |
| 5,295,553 A | 3/1994 | Morita et al. | |
| 5,314,207 A | 5/1994 | Camfield et al. | |
| D355,870 S | 2/1995 | Dieudonne | |
| 5,505,493 A | 4/1996 | Camfield et al. | |
| 5,573,262 A * | 11/1996 | Chi | 280/279 |
| 6,003,890 A | 12/1999 | Inouye | |
| 6,082,754 A | 7/2000 | Jeunet et al. | |
| 6,170,841 B1 | 1/2001 | Mizuta | |
| 6,186,524 B1 | 2/2001 | McQueeny et al. | |
| 6,378,884 B1 | 4/2002 | Kettler | |
| 6,799,772 B1 | 10/2004 | Kettler et al. | |

FOREIGN PATENT DOCUMENTS

| | | |
|---|---|---|
| CH | 314538 | 6/1956 |
| DE | 892722 | 10/1953 |
| DE | 3242863 | 5/1984 |
| DE | 3914050 | 10/1990 |
| DE | 29901449 | 6/1999 |
| DE | 29911652 | 10/1999 |
| DE | 2 9822875 | 6/2000 |
| DE | 1 9962468 | 7/2000 |
| FR | 2614002 | 10/1988 |
| FR | 2755419 | 5/1998 |
| GB | 145370 | 7/1920 |
| GB | 815456 | 6/1959 |
| GB | 2042910 | 10/1980 |
| GB | 2129319 | 5/1984 |
| GB | 2145382 | 3/1985 |
| GB | 2190635 | 11/1987 |
| GB | 2283217 | 5/1995 |
| WO | 95/32118 | 11/1995 |

OTHER PUBLICATIONS

Three sheets labeled "ACKNOWLEDGMENT" which Radio Flyer alleges to be evidence that the Radio Flyer model No. 77 was sold during 1998.

A sheet entitled "Restricted Turning Prior Art" which Radio Flyer alleges to be evidence that the Radio Flyer model No. 77 was released Feb. 19, 1998.

A sheet entitled "Product Name: Roll N Ride" which Radio Flyer alleges to be evidence that the product shown in the photographs utilizes features recited in certain claims of US patent 6,799,772.

A sheet entitled "Product Name: Grow-With-Me-Trike" which Radio Flyer alleges to be evidence that the product shown in the photographs utilizes features recited in certain claims of US patent 6,799,772.

A sheet entitled "Product Name: Baby Too" which Radio Flyer alleges to be evidence that the product shown in the photographs utilizes features recited in certain claims of US patent 6,799,772.

A sheet entitled "Product Name: Tough Trikes" and "Product Name: Push'n Pedal Trike" which Radio Flyer alleges to be evidence that the products shown in the photographs utilizes features recited in certain claims of US patent 6,799,772.

Two sheets entitled "HBC Model 29875 CS 04G" which Radio Flyer alleges to be evidence that the product shown in the photographs utilizes features recited in certain claims of US patent 6,799,772.

Two sheets entitled "Smoby Pilot Alu Plus Jugueles Pico S.A." which Radio Flyer alleges to be evidence that the product shown in the photographs utilizes features recited in certain claims of US patent 6,799,772.

Two sheets entitled "Fisher Price Rock, Roll and Ride XL" which Radio Flyer alleges to be evidence that the product shown in the photographs utilizes features recited in certain claims of US patent 6,799,772.

Two sheets entitled "Charton Baby Driver 2 39150 St. Laurent France" which Radio Flyer alleges to be evidence that the product shown in the photographs utilizes features recited in certain claims of US patent 6,799,772.

Two sheets entitled "Processed Plastics West Coast Choppers" which Radio Flyer alleges to be evidence that the product shown in the photographs utilizes features recited in certain claims of US patent 6,799,772.

Two sheets entitled "Processed Plastic Item 17800-2" which Radio Flyer alleges to be evidence that the product shown in the photographs utilizes features recited in certain claims of US patent 6,799.772.

Two sheets entitled "Fischer Price Kawasaki (US Patent 6,651,528)" which Radio Flyer alleges to be evidence that the product shown in the photographs utilizes features recited in certain claims of US patent 6,799,772.

Two sheets entitled "Mattel Hot Wheels" which Radio Flyer alleges to be evidence that the product shown in the photographs utilizes features recited in certain claims of US patent 6,799,772.

Two sheets entitled "Tek-Net Toys Int'l Inc. USA 020821 Emergency 911" which Radio Flyer alleges to be evidence that the product shown in the photographs utilizes features recited in certain claims of US patent 6,799,772.

Two sheets entitled "Fischer Price L&S Ride on Harley" which Radio Flyer alleges to be evidence that the product shown in the photographs utilizes features recited in certain claims of US patent 6,799,772.

Two sheets entitled "Friendly Toys Item #7112 Fold-Up Trike" which Radio Flyer alleges to be evidence that the product shown in the photographs utilizes features recited in certain claims of US patent 6,799,772.

English Language Abstract of GB 815,456.

English Language Abstract of DE 32 42 863.

English Language Abstract of DE 39 14 050.

English Language Translation of Swiss No. 290478.

Document showing Radio Flyer model #77 entitled "Restricted Turning Prior Art" asserted by Radio Flyer to be prior art against the instant application in Civil Action No. 204-CV-614. During litigation, Radio Flyer presented to Applicant two Radio Flyer model #77 trikes and asserted that these trikes were prior art. One trike had an adhesive label with the following text "P.D. Jun. 1999" and another trike had an adhesive label with the text "P.D. Jul. 1998".

Applicant has no knowledge with regard to the meaning of "P.D.". Additionally, during litigation, Applicant ordered three Radio Flyer model #77 trikes on ebay rom three different individuals. One trike had an adhesive label with the following text "P.D. Jan. 1999", another trike had an adhesive label with the text "P.D. Jul. 1999", and another trike had an adhesive label with the text "P.D. Oct. 1999". Applicant has no knowledge with regard to whether or when any of these five trikes was sold or offered for sale in the U.S.

Italtrike "Kids on wheels" catalog (in color) pp. KET2818-KET2841 dated Jan. 2005.

Italtrike International "Kids on wheels" catalog (in color) pages 100004-100027 dated Jan. 2000.

Italtrike International catalog pp. 100028-100039.

Radio Flyer catalog (in color) entitled "Specialty Collection 2000" pp. RF01266-RF01273.

Radio Flyer catalog (in color) entitled "Product Catalog 2000" pp. RF01274-RF01305.

Radio Flyer catalog (in color) entitled "Consumer Product Catalog" pp. RF01306-RF01313.

Radio Flyer catalog (in color) entitled "Product Catalog 1999" pp. RF01314-RF01349.

Radio Flyer catalog ( in color) entitled "Specialty Collection Catalog 1999" pp. RF01350-RF01357.

Radio Flyer catalog (in color) pp. RF01358-RF01388.

Radio Flyer 1998 catalog (in color) pp. RF01389-RF01396.

Hand made drawing page No. RF12204 on ITALTRIKE letterhead. The drawing has a handwritten date of Jan. 21, 1987.

Hand made drawing page No. RF12206 on ITALTRIKE letterhead. The drawing has a handwritten date of Jan. 21, 1987.

Black and while picture allegedly showing a mold having page No. RF12208.

Black and white picture allegedly showing mold parts having page No. RF12209.

Sheet table in Italian having a stamp entitled "N. CITTON & C, s.a.s.".

Cover page of Europeo (in color) having page RF12230 and dated Feb. 1, 1991.

Four sheets with page Nos. RF12244-A, -B, -C and -D (in color) showing various pictures of trikes and a scooter on what appears to be notebook pages.

Four sheets with page Nos. RF12245-A, -B, -C and -D (in color) showing various pictures of trikes and a bike on what appears to be notebook pages.

* cited by examiner

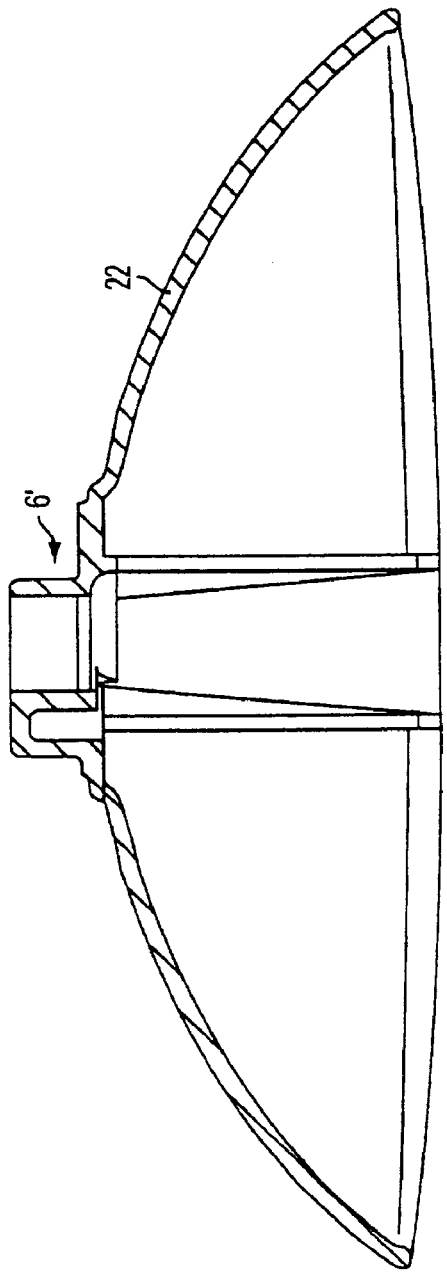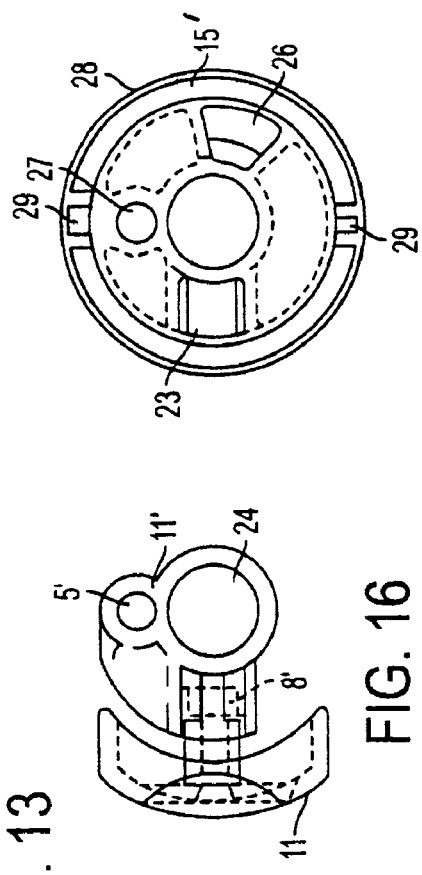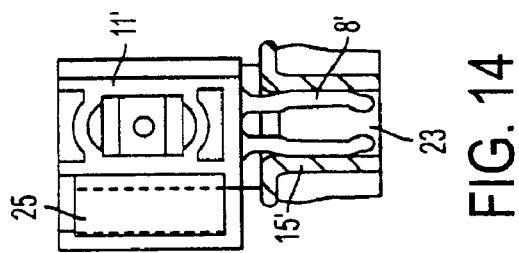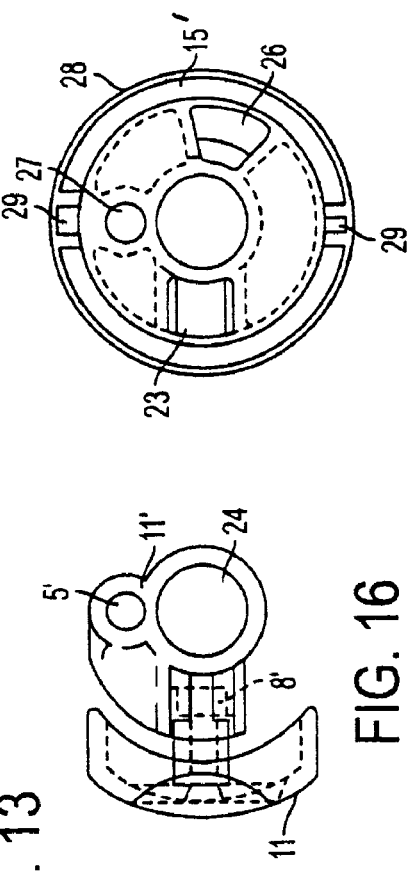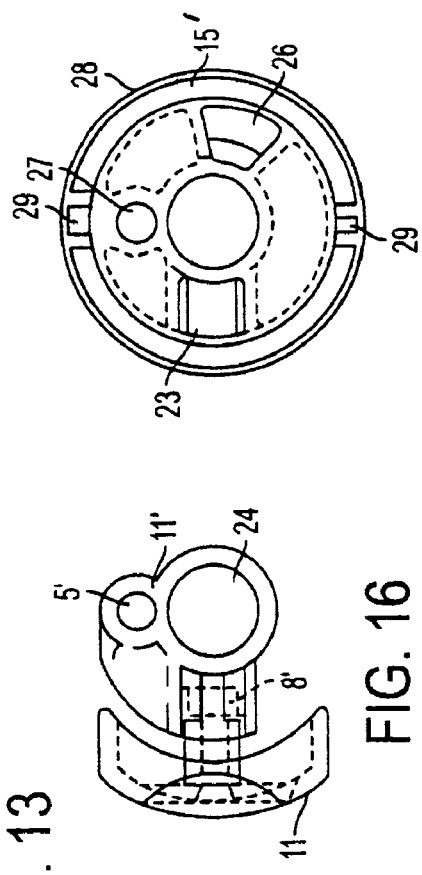

VEHICLE STEERING HEAD

CROSS-REFERENCE TO RELATED APPLICATIONS

The present application is a continuation of U.S. application Ser. No. 10/298,002 which was filed Nov. 18, 2002 now U.S. Pat. No. 6,799,772, which is a continuation of U.S. application Ser. No. 10/092,516 filed Mar. 8, 2002 now abandoned which is a continuation of U.S. application Ser. No. 09/584,497 filed Jun. 1, 2000, now U.S. Pat. No. 6,378,884, the disclosures of which are expressly incorporated by reference herein in their entireties. Further, the present application claims priority under 35 U.S.C. § 119 of German Patent Application No. 299 11 652.2, filed on Jul. 5, 1999, the disclosure of which is expressly incorporated by reference herein in its entirety.

BACKGROUND OF THE INVENTION

1. Field of the Invention

The present invention relates to a vehicle steering head and in particular, to a steering head for a vehicle comprising a support tube which has rotatably supported therein a fork member to which a wheel cover and a handlebar can be secured.

2. Discussion of Background Information

Vehicle steering heads of the above-described type are in particular used in bicycles or tricycles, and in particular in tricycles or bicycles for children.

In devices of the above-described type it is desirable for safety reasons that accidents be avoided which may be caused by an excessively large handlebar deflection. It has been found that when there is an excessively large handlebar deflection (e.g., the handle bar rotates beyond a point where effective steering occurs), the vehicle may tilt to the side. Moreover, such deflections or excessive rotation may run the risk that a user impacts his body against the handlebar. Additionally, the user may get caught with his/her feet in the front wheel and may be even be injured by the pedals.

A further drawback or disadvantage of prior-art devices occurs when they are pushed with a push rod type device. In such cases, these devices have a tendency towards uncontrolled steering movements of the front wheel which cannot be mastered or effectively controlled by small children, in particular.

SUMMARY OF THE INVENTION

The present invention therefore provides a vehicle steering head of the above-mentioned type which is of a simple construction and which can operate in an easy and reliable manner. Moreover, this design avoids the drawbacks of the prior art and can in particular limit a handlebar deflection to a desired degree. The invention also has provision for locking the handlebar.

According to one aspect of the invention a latch element is secured to a fork member on a portion provided inside the support tube. A linkage element is supported in the support tube for rotation therewith. The linkage element is displaceable or moveable in a longitudinal direction of the support tube. The linkage element comprises at least one stop surface which limits a rotation of the fork member and can be brought into contact with the latch element. Moreover, the linkage element comprises at least one locking element which is releasably connectable to the latch element.

According to another aspect of the invention a latch element is supported on the support tube. A linkage element is arranged on the fork member and connected to the tube for rotation therewith. The latch element is freely displaceable or moveable along the support tube. The linkage element comprises at least one stop surface which limits a rotation of the fork member and can be brought into contact with the support tube. Moreover, at least one latch element is provided that is releasably connectable to the support tube.

The vehicle steering head according to the invention is characterized by a number of considerable advantages.

First of all, it is possible to install or utilize the steering head in a frame of any desired design, e.g. children's bicycles or tricycles. Ideally, the dimensions of the steering head are such that they do not interfere with the remaining structure of the frame within which it is installed. Of course, the steering head may be combined with any and all common types of frames where ever its advantageous design is desired. Accordingly, the steering head may be utilized in a variety of devices where limited deflection or rotation and/or locking are desired.

Because the invention utilizes a latch element which is arranged in the support tube, no functional parts of the steering head need be outwardly visible or accessible. Accordingly, the internal parts are less susceptible to damage. Additionally, this design is less likely to cause injury when used by children or infants.

As a result of utilizing a linkage element according to the invention, it is possible to reliably lock the fork member and thus the wheel fork and the front wheel. Such a locking provision is easily be accomplished by displacing or moving the linkage element. This design ensures a high degree of operational safety and operational reliability.

The linkage element preferably utilizes stop surfaces which cooperate with the latch element in a manner where they are brought into contact with one another. In this way, the steering angle can be limited to a particularly or desired range. This limited range of motion of the steering angle can be realized according to the invention in different ways. The invention contemplates that the available steering angle is freely selectable within a wide desired range. This is of particular advantage to vehicles for children such as tricycles, which may require a steering angle of approximately 45° to each side. Of course, other desirable steering angles can be utilized. However, by designing in the desired limited steering angle, lateral tilting of the tricycle or similar devices can be prevented or their risk significantly reduced. Additionally, the risk of injuries which may be caused by the pedals, e.g., devices which utilize pedals on the front wheel can be reduced. Finally, the risk of injury which can occur when the handlebar exceeds a controlled steering angle can be ruled out to a considerable extent.

The invention also provides for a linkage element having a locking element which is releasably connectable to the latch element. This design ensures that when a push rod is used for pushing the device, i.e., a tricycle, the front wheel thereof may be reliably locked in place during straight travel.

In an advantageous embodiment of the invention, the latch element is designed in the form of a pin which extends in a direction transverse to the fork member. The pin may extend through the fork member such that it projects at both sides of the fork member. Alternatively, the pin can project from the fork member on only one side. Moreover, the pin can be firmly connected to the fork member, e.g. by welding or other conventional attachment techniques. Additionally, it may be secured by press fitting with or without utilizing a knurled portion. Of course, the dimensions of the pin can easily be adapted to the respective conditions of use.

It should be noted that the manufacturing costs of the steering head are reduced by the above-described construction to quite a considerable degree.

In another advantageous embodiment of the invention, the linkage element is substantially designed in the form of a hollow cylinder. Thus, the linkage element can be reliably guided in the support tube and surround the fork member. Additionally, the linkage element can be designed as a single integral part or several parts which are either joined together or which cooperate together.

It is advantageous for the longitudinal displacement or movement of the linkage element to be along an axis of the support tube and the fork member. Accordingly, the support tube may comprise at least one longitudinal slot or a similar recess through which a connection element extends which is connected to the linkage element. This design also utilizes a slide which is arranged outside the support tube.

The slide facilitates the ease of handling or movement of the linkage element. In such a design, a displacement of the slide, which may additionally be provided with locking mechanism or fixing safety mechanism, effects a corresponding displacement or movement of the linkage element. The locking mechanism or fixing mechanism allows for fixing the front wheel in a single or set travel position which is preferably straight. Moreover, the invention also contemplates that the linkage element may be provided with inclined inlet surfaces or intercepting mechanisms which engage the latch element so as to initiate a locking action when the front wheel is slightly deflected angularly.

Stop surfaces on the latch element are preferably formed on at least one front attachment of the linkage element. Additionally, it is particularly advantageous when two opposite attachments or stops are in symmetry with each other and are each provided with at least one stop surface located on the linkage element. Thus, by utilizing two attachments or stops which are in symmetry with each other, this design can limit the steering angle in a symmetrical fashion to both the left and the right side.

In another advantageous embodiment of the invention, the associated stop surfaces of the attachments or stops act to limit the rotation of the fork member to a predetermined angular range at both sides. This angular range may e.g. be approximately 45° to both sides, for a total range of motion of approximately 90°.

The locking element is preferably designed in the form of at least one front recess which receives the latch element. Such an advantageous design makes it possible to grip and fix the latch element upon displacement or movement of the linkage element. Additionally, it is advantageous that the recess be retracted or set back relative to the front attachment, so that the attachments or stops can always remain in the plane of the latch element, while upon a displacement of the latch element, it is only the recess which can additionally be brought into engagement.

To implement a simple and operationally reliable structure of the steering head, it may be advantageous for the recess to be centrally arranged between the two attachments or stops.

The invention also contemplates that the fork member itself has not been changed constructionally. In other words, the invention can be adapted to work with a conventional fork member. Also, the invention makes it possible to manufacture all functional parts separately in a very simple manner. As a result, advantageous on costs can be achieved.

In a preferred design of a previously described embodiment, the linkage element is designed as part of a mudguard which extends from below into the support tube. This design allows for significant cost savings since the mudguard is normally made from plastics and is typically already included in most vehicles of the above described type. The linkage element can thus be mounted on the mudguard or made integrally therewith, in a particularly easy way and at low costs.

A further advantage of the this embodiment is that the latch element can be designed in the form of a bolt which arranged to be parallel with the fork member. The latch element of this design can thus be given relatively large dimensions so that the diameter of the support tube itself need not be chosen with such a large size.

It may be of particular advantage when the latch element is connected to a slide which extends into the support tube so as to be able to design the lock of the front wheel in a particularly simple manner. Furthermore, the locking element may preferably be connected to the slide. Moreover, the locking element serves to reliably maintain the locked state and to prevent any unintended unlocking. The locking element also preferably engages into a recess of a bearing which supports the fork member in the support tube. As a result, it is not necessary to mount additional parts or to take installation measures on the support tube itself.

It may also be of particular advantage for the limitation of the steering angle to be accomplished by a lower bearing which supports the fork member in the support tube. This lower bearing may have formed thereon an attachment which projects in the direction of the linkage element and which can be brought into contact with the stop surfaces formed on the linkage element and thus on the mudguard. This design has the advantageous effect that the predetermined angular range can be limited at both sides as well, e.g. approximately 45° each side.

The invention provides a vehicle steering head including a support tube which rotatably supports therein a fork member to which a wheel fork and a handlebar can be secured, the steering head including a latch element projecting from the fork member and disposed within the support tube, and a linkage element disposed within the support tube, wherein the linkage element is moveable in a direction which is substantially parallel to an axis of the fork member and comprises at least one stop surface for limiting a rotation of the fork member when the latch element contacts the at least one stop surface. The linkage element may further comprise at least one locking element for locking the fork member in a single position. The at least one locking element may releasably engage the latch element when the fork member is locked. The latch element may comprise a pin. The pin may project substantially perpendicular to the axis of the fork member. The linkage element may comprise a substantially cylindrical shape. The linkage element may comprise a plurality of hollow chambers separated by connecting walls. The support tube may comprise an opening which allows a connecting element to pass therethrough. The opening may comprise a longitudinal slot. The connecting element may be secured to the linkage element. The movement of the linkage element may be limited by the movement of the connecting element within the longitudinal slot. The steering head may further comprise a slide which is secured to the connecting element, the slide being disposed adjacent an outer surface of the support tube. The at least one stop surface may be disposed on at least one stop.

The at least one stop may comprise a projection which extends from the linkage element. The at least one stop may comprise a wedge-shaped hollow projection having two angled lateral stop surfaces. The at least one stop may comprise two stops which are disposed opposite one another. Each stop may comprise a wedge-shaped hollow projection having two angled lateral stop surfaces. The two stops may define a limited range of rotational motion of the fork member in each of a clockwise and a counter-clockwise direction. The limited range of motion in the clockwise direction may be substantially equal to the range of motion in the counter-clockwise direction. The limited range of motion in one of the clockwise and counter-clockwise direction may be approximately 45 degrees.

The linkage element may further comprise at least one locking element, the at least one locking element comprising at least one recess which is adapted to receive the latch element. The at least one recess is set back some distance from a surface of at least one stop. The at least one recess is centrally disposed between at least two stops.

The steering head may further comprise an upper bearing disposed on one end of the support tube and a lower bearing disposed on another end of the support tube, each of the upper and lower bearings having an opening which allows the fork member to pass therethrough.

The steering head may be disposed on a tricycle frame.

The invention also provides for a vehicle steering head including a support tube which rotatably supports therein a fork member to which a wheel fork and a handlebar can be secured, the steering head including a latch element disposed within the support tube, the latch element being moveable in a direction which is substantially parallel to an axis of the fork member, and a linkage element connected to the fork member so as to rotate therewith, the linkage element comprising at least one stop surface, wherein the at least one stop surface limits the rotation of the fork member with respect to the support tube. The steering head may further comprise a slide, wherein the slide is disposed within the support tube and retains the latch element. The slide may further comprise at least one locking element for releasably securing the slide to the support tube. The linkage element may comprise a mudguard. The mudguard may be disposed between one end of the support tube and a wheel fork. The latch element may comprise a rod like member which is arranged substantially parallel to the axis of the fork member. The rod like member may comprise one of a bolt and a pin. The latch element may be connected to a slide, the slide being disposed within the support tube. The slide may be moveable substantially parallel to the axis of the fork member. A locking element may be connected to the slide.

The steering head may further comprise a bearing support disposed on at least one end of the support tube. The bearing support may be disposed on a lower end of the support tube. The steering head may further comprise a locking element disposed within the support tube, the locking element being insertable into a recess of the bearing support. The bearing support may comprise at least one stop, the at least one stop comprising at least one surface which engages the linkage element. The at least one stop may comprise a projection which engages a recess in the linkage element. The projection and the recess may cooperate to limit the rotational movement of the fork member within a desired range. The range of the rotational movement may be limited by at least two stop surfaces. The at least two stop surfaces may define a limited range of rotation in one of a clockwise and a counter-clockwise direction. The at least two stop surfaces may define a limited range of rotation in each of a clockwise and a counter-clockwise direction. The limited range of rotation between the at least two stops may be approximately 45 degrees.

The steering head may be disposed on a tricycle frame.

The invention further provides for a vehicle steering head including a support tube and fork member which is rotatably mounted with respect to the support tube, the steering head including an upper bearing support disposed at an upper end of the support tube and a lower bearing support disposed at a lower end of the support tube. The fork member comprises a fork end, a handlebar, and a latch element projecting from the fork member between the fork end and the handlebar end. The latch element is disposed within the support tube and a linkage element is slidably disposed within the support tube. The linkage element comprises at least one stop surface for engaging the latch element, wherein the linkage element is moveable in a direction which is substantially parallel to an axis of the fork member from a first position where the latch element and the at least one stop cooperate to limit the rotational movement of the fork member to a second position where the latch element releasably engages a locking element disposed on the linkage element whereby the fork member is prevented from rotating in any direction. The linkage element may be moveable from outside the support tube via a slide. The slide may be connected to the linkage element via a connection element, the connection element passing through a longitudinal in the support tube. The longitudinal slot may limit the movement of the linkage element.

The invention also relates to a vehicle steering head including a support tube and fork member which is rotatably mounted with respect to the support tube, the steering head including an upper bearing support disposed at an upper end of the support tube and a lower bearing support disposed at a lower end of the support tube. The lower bearing support comprises at least one stop surface, the fork member comprising a fork end, a handlebar, and a latch element which is slidably disposed adjacent the fork member between the fork end and the handlebar end, the latch element being disposed within the support tube and a linkage element moveably disposed adjacent the lower support bearing. The linkage element comprises at least one stop surface for engaging the at least one stop surface of the lower bearing support and comprising a recess for receiving the latch element, wherein the linkage element is moveable in a direction which is substantially parallel to an axis of the fork member from a first position where the latch element engages only the lower bearing support and where the at least one stop of the lower bearing support cooperates with the at least one stop of the linkage element to limit the rotational movement of the fork member to a second position where the latch element releasably engages a recess in the linkage element whereby the fork member is prevented from rotating in any direction. The linkage element may be moveable from outside the support tube via a slide. The slide may be connected to the linkage element via a connection element, the connection element passing through a longitudinal in the support tube. The longitudinal slot may limit the movement of the linkage element. The linkage element may further comprise at least one locking element for engaging a locking recess in the lower bearing support. The at least one locking element engages the locking recess of the lower bearing support when the latch element engages the recess in the linkage element.

The invention provides for a vehicle steering head including a fork member adapted to engage a handlebar, a support tube which rotatably supports the fork member, a latch element disposed within the support tube, and a slide which is moveable with respect to the support tube, wherein the slide is moveable from at least one position wherein linkage element prevents the fork member from rotating with respect to the support tube to at least another position wherein the linkage element allows the fork member to rotate with respect to the support tube in at least two directions. The latch element may comprise a rod-like member.

The invention also provides for a vehicle steering head that includes a support tube adapted to be coupled to a vehicle frame, an upper bearing support arranged at an upper end of the support tube, a lower bearing support arranged at a lower end of the support tube, the lower bearing support comprising at least one stop surface, a cylindrical element rotatably mounted to the support tube via the upper and lower bearing supports, the cylindrical element having one end that is adapted to be connected to a wheel fork and another end that is adapted to be connected to a handlebar, a latch element movably disposed within the support tube, a slide coupled to the latch element, the latch element being movable from outside the support tube, a linkage element that is rotatable with respect to the support tube, and the linkage element cooperating with the lower bearing support to limit a rotational movement of the linkage element with respect to the support tube, wherein the latch element and the linkage element are releasably engagable with each other to prevent rotational movement of the cylindrical element.

The invention also provides for a vehicle steering head comprising a support tube adapted to be fixed to a frame, a fork member adapted to connect a wheel fork to a handlebar, the fork member being rotatable with respect to the support tube, a mechanism which limits the rotational movement of the fork member in each of two directions, and a lower bearing support mounted to the support tube, wherein the mechanism and the lower bearing support cooperate to limit the rotational movement of the fork member.

The lower bearing support may be non-rotatably fixed to the support tube. The lower bearing support may comprise at least one stop surface. The lower bearing support may comprise two stop surfaces. The mechanism may comprise at least one stop surface. The mechanism may comprise two stop surfaces. The mechanism may comprise a linkage element having at least one stop surface. The linkage element may rotate with the fork member. The linkage element may be arranged on a mudguard. The fork member may be cylindrically shaped. The steering head may further comprise a handlebar connected to one end of the fork member and a wheel fork connected to another end of the fork member.

The invention also provides a vehicle steering head comprising a support tube adapted to be fixed to a frame, a cylindrical member adapted to connect a wheel fork to a handlebar, the cylindrical member being rotatable with respect to the support tube, a linkage element being movable and comprising at least two stop surfaces, wherein one of the at least two stop surfaces limits the rotation of the cylindrical member in one direction, and wherein another of the at least two stop surfaces limits the rotation of the cylindrical member in another direction.

The linkage element may rotate with the cylindrical member. The linkage element may rotate with a mudguard.

The invention also provides for a vehicle steering head comprising a support tube adapted to be fixed to a frame, a connecting element adapted to connect a wheel fork to a handlebar, the connecting element being rotatable with respect to the support tube, a linkage element being rotatable and comprising at least two stop surfaces, a mudguard that rotates with the linkage element, one of the at least two stop surfaces limiting the rotation of the connecting element in one direction, and another of the at least two stop surfaces limiting the rotation of the connecting element in another direction.

The invention also provides for a vehicle steering head comprising a support tube adapted to be fixed to a frame, a fork member adapted to connect a wheel fork to a handlebar, the fork member being rotatable with respect to the support tube, and a system which limits the rotational movement of the fork member in each of two directions, wherein the system includes one part which is non-rotatably mounted to the support tube and another part which rotates with the fork member.

BRIEF DESCRIPTION OF THE DRAWINGS

The present invention is further described in the detailed description which follows, in reference to the noted plurality of drawings by way of non-limiting examples of embodiments of the present invention, in which like reference numerals represent similar parts throughout the several views of the drawings, and wherein:

FIG. 13 is a sectional view of the arrangement according to FIG. 12 along the sectional lines XIII—XIII of FIG. 12;

FIG. 14 is an enlarged side view showing a portion of the slide and of the locking element in the locked state;

FIG. 15 is a view analogous to FIG. 14, in the unlocked state;

FIG. 16 is a top view on the slide; and

FIG. 17 is a top view on the lower bearing.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
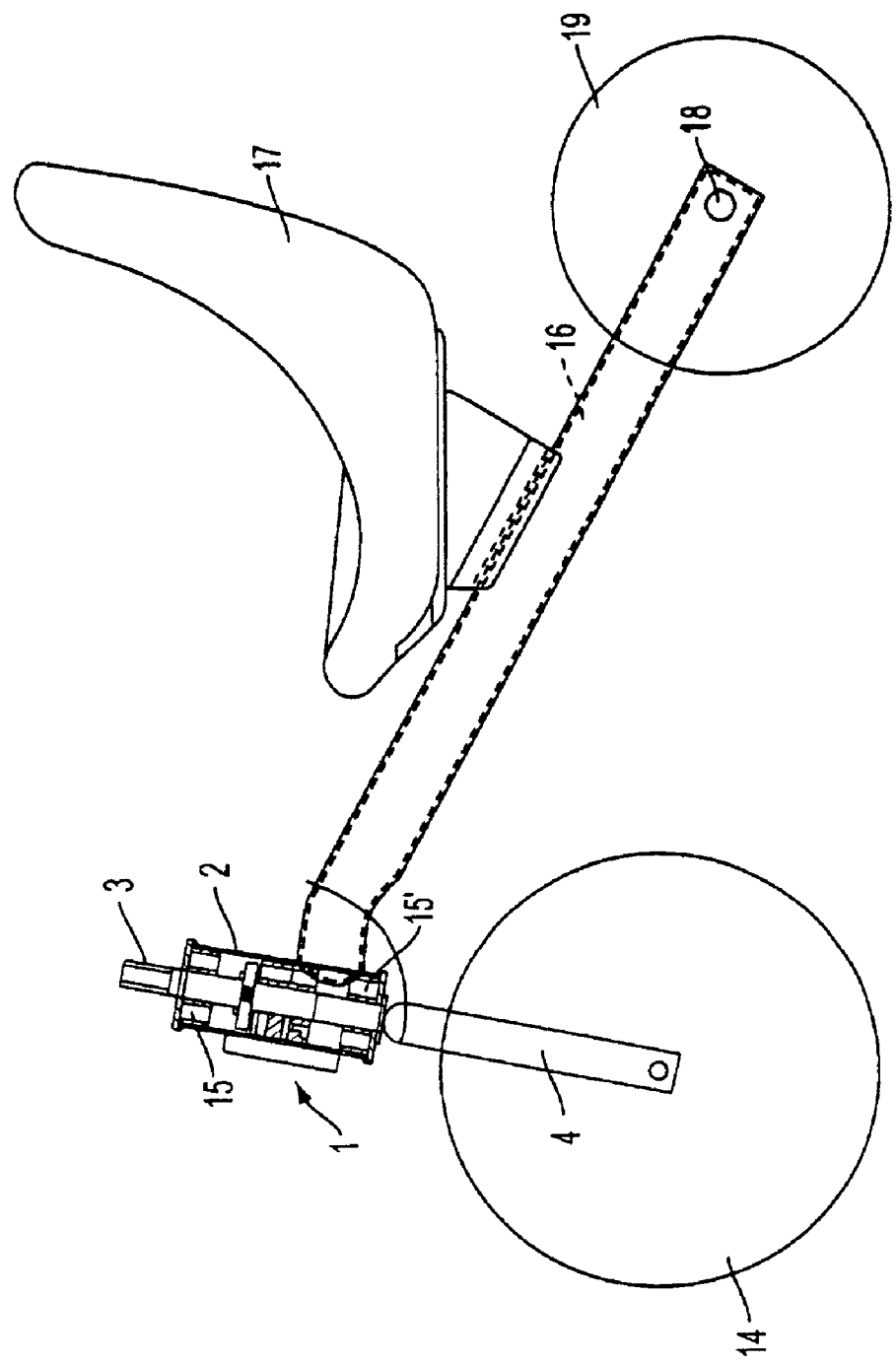
FIG. 1 is a schematic side view of a children's tricycle with one embodiment of the vehicle steering head according to the invention.

A children's tricycle is shown in FIG. 1 and comprises a front wheel 14 which is supported on a wheel fork 4. Wheel fork 4 is fixedly connected to a fork member 3. A handlebar (not shown) can be secured to the upper end of fork member 3.

Fork member 3 is supported in a support tube 2. This support is accomplished by utilizing slide bearings 15 and 15' which are shown in detail in FIGS. 2 to 5. The slide bearings 15 and 15' correspond to those of the prior art in this embodiment so that a detailed description is not needed.

Support tube 2 is firmly connected to a frame 16 which has mounted thereon a seat 17. The tricycle also has a rear axle 18 with rear wheels 19. Accordingly, a support tube 2 and a fork member 3 form a steering head 1.

Figure 6:
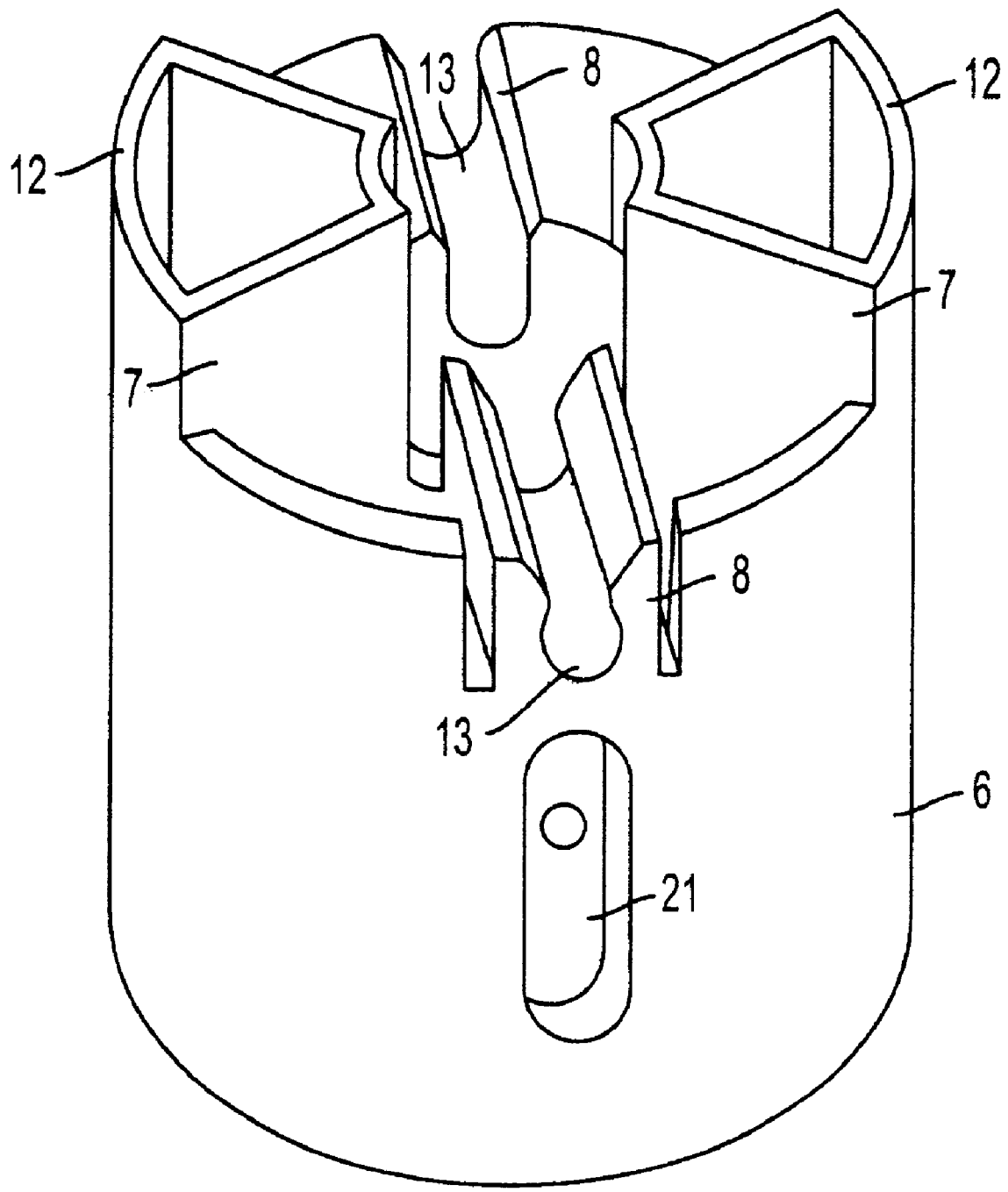
FIG. 6 is a simplified perspective illustration of the linkage element according to the invention.

According to the invention, support tube 2 has arranged therein a linkage element 6 which has a substantially cylindrical configuration (see also FIG. 6) and which is received with a play or clearance (so that it can slide) within support tube 2. Linkage element 6 is also provided with a central recess through which fork member 3 extends or passes.

Support tube 2 also has formed therein a longitudinal slot 9 through which a connection element 10 extends or passes. This connection element 10 is connected to a slide 11 and linkage element 6. The connection may be via a screw 20 (see FIGS. 2 and 4) or other conventional connecting mechanism. In the illustrated embodiment, connection element 10 is integrally connected to or formed with slide 11 and extends in a recess 21 of linkage element 6. However, connection element 10 and slide 11 may be made as separate components which are joined or secured together by any conventional attachment technique including a screw or threaded element.

On its front upper portion, linkage element 6 comprises two symmetrical opposite attachments or stops 12. Each of these stops 12 may be provided with lateral stop surfaces 7. When viewed from the top, these attachments or stops 12 are designed in a manner of a segment of a partial circle (pie shaped or wedge shaped), so that four stop surfaces 7 are formed, with each one being arranged in symmetry with one another. Of course, stops 12 may be separately formed and attached to linkage element 6 instead of being integrally formed therewith, as is shown.

In the illustrated embodiment two locking elements 8 may be utilized in which each is formed by a recess 13. These locking elements 8 are preferably provided on linkage element 6 in retracted or set back manner with respect to stops 12. As is apparent from FIG. 6, the walls of at least one recess 13 may be made resilient to ensure a releasable locking of a bolt-like latch element 5 when linkage element 6 is pushed upwards or into engagement with bolt-like latch element 5.

As is apparent from FIGS. 2 to 5, fork member 3 is provided with a bolt-like or pin-like latch element 5 which extends or projects from at least one and preferably both sides of fork member 3. Of course, latch element 5 may be integrally formed with fork member. Alternatively, latch element 5 may be a threaded or partially threaded member which threads into fork member 3. However, it is preferred that latch element 5 be a pin having a centrally disposed exterior knurl which is press fit into a fork member as is shown. In its working position, latch element 5 rotates with fork member 3 when a deflection or rotation of the handlebar takes place. The deflection of the handlebar is limited by way of latch element 5 abutting on stop surfaces 7, these stop surfaces 7 defining the limited range of motion of the handlebar.

Figure 2:
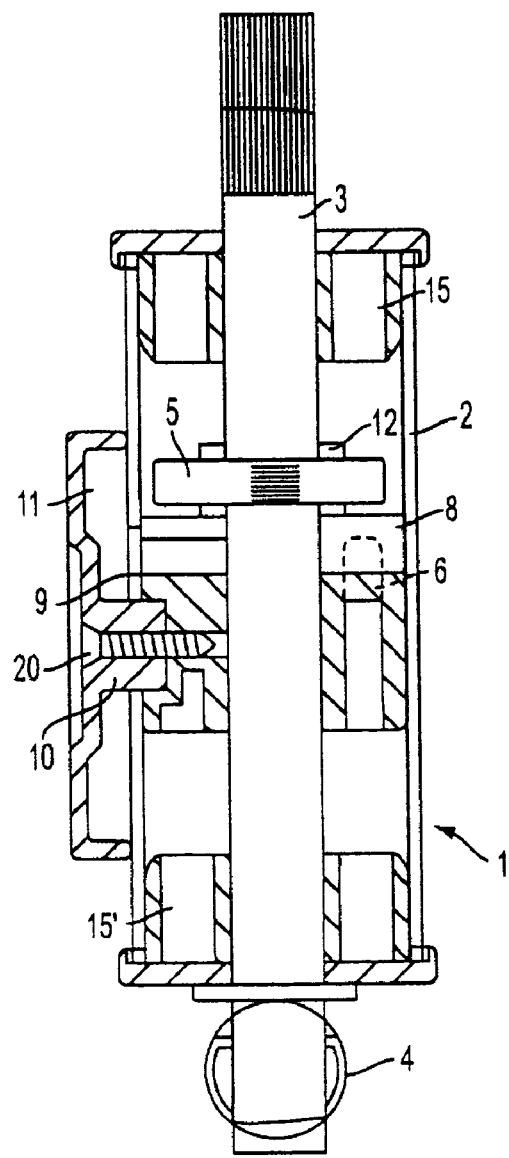
FIG. 2 is a simplified sectional side view of the steering head according to the invention in an unlocked state.
Figure 3:
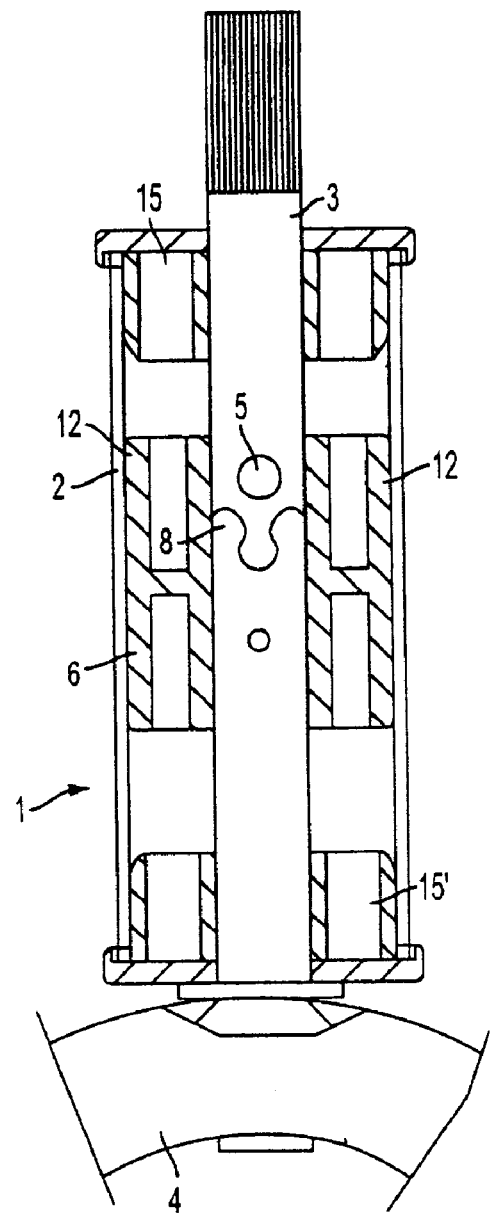
FIG. 3 is a side view, turned or oriented by 90° (a right angle) of the arrangement shown in FIG. 2.
Figure 4:
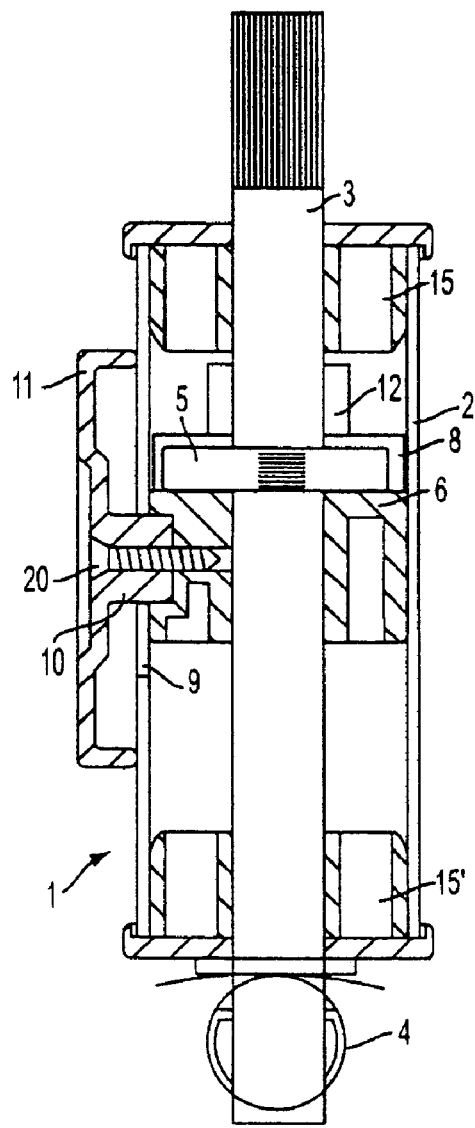
FIG. 4 is a sectional side view similar to FIG. 2, in the locked state.
Figure 5:
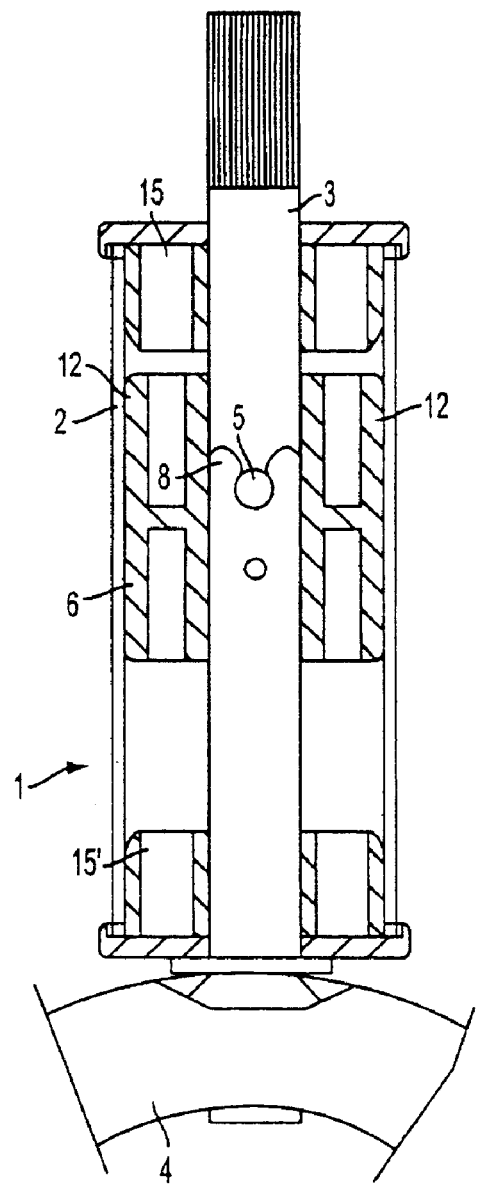
FIG. 5 is a side view, similar to FIG. 3, of the view according to FIG. 4.

When it is desired to lock the handlebar in a set position, latch element 5 is pressed or forced into recesses 13. This engagement occurs when locking element 8, which is disposed on linkage element 6, is pushed upwards by slide 11. Recesses 13 also utilize inclined inlet surfaces because they act as guiding lead-in surfaces which facilitate entry of pin 5 into recess 13. In the locked state, which is shown in FIGS. 4 and 5, a steering movement thus becomes impossible since the handlebar or fork member 3 is locked in a single direction. FIGS. 2 and 3 show a downwardly displaced condition of linkage element 6 in which latch element 5 is in a position which it does not cooperate with the locking element 8. As a result, in this position fork member 3 and handlebar are free to rotate until latch element 5 abuts on stop surfaces 7, this range of movement or rotation corresponding to a steering angle range.

According to a preferred aspect of the invention, linkage element 6 may be made from a plastic material. Of course, other materials are also contemplated.

Another embodiment of the vehicle steering head according to the invention is described with reference to FIGS. 7 to 16. In this regard, like parts are provided with like reference numerals.

Figure 7:
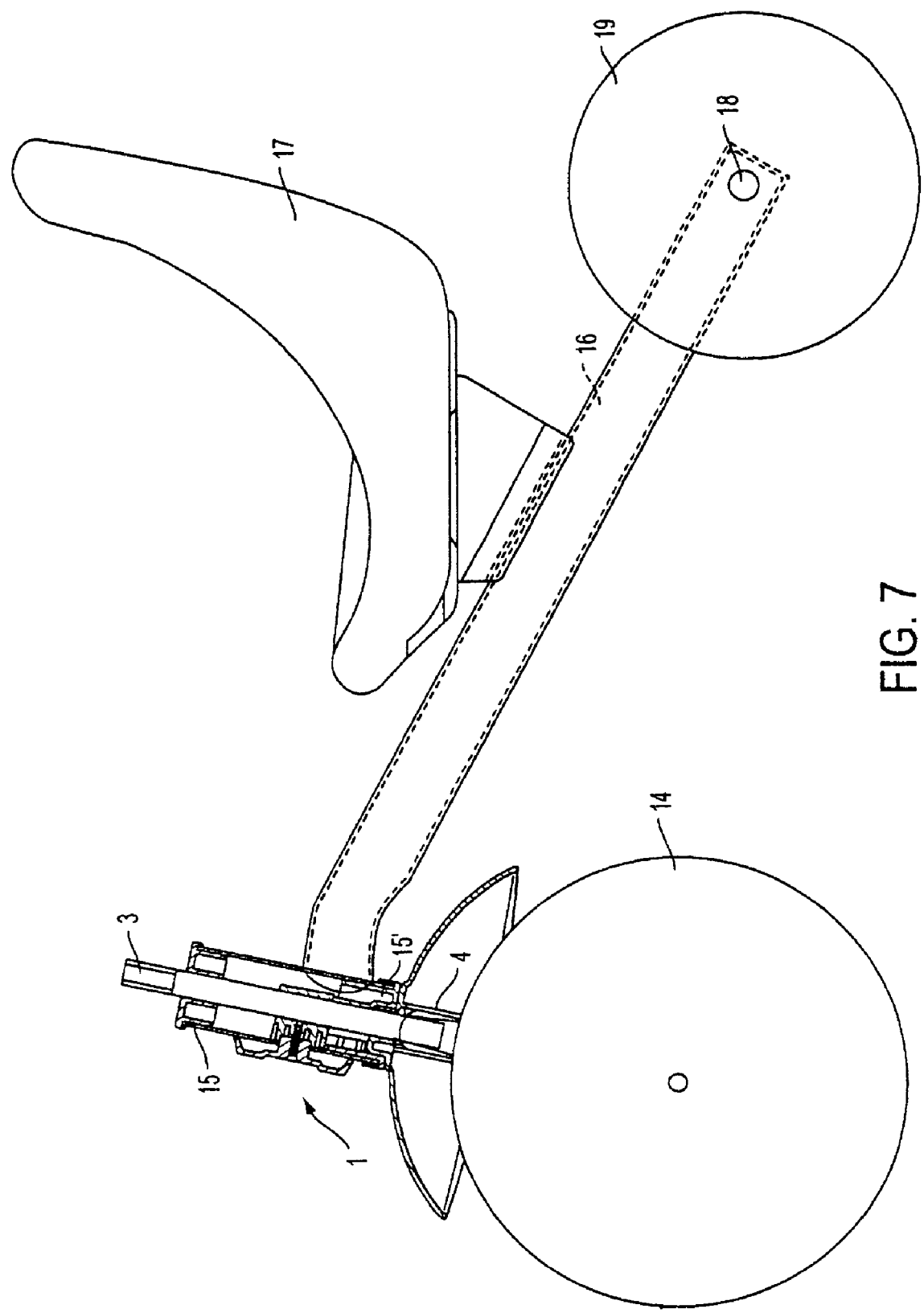
FIG. 7 is a schematic side view of a children's tricycle with another embodiment of the vehicle steering head according to the invention.
Figure 8:
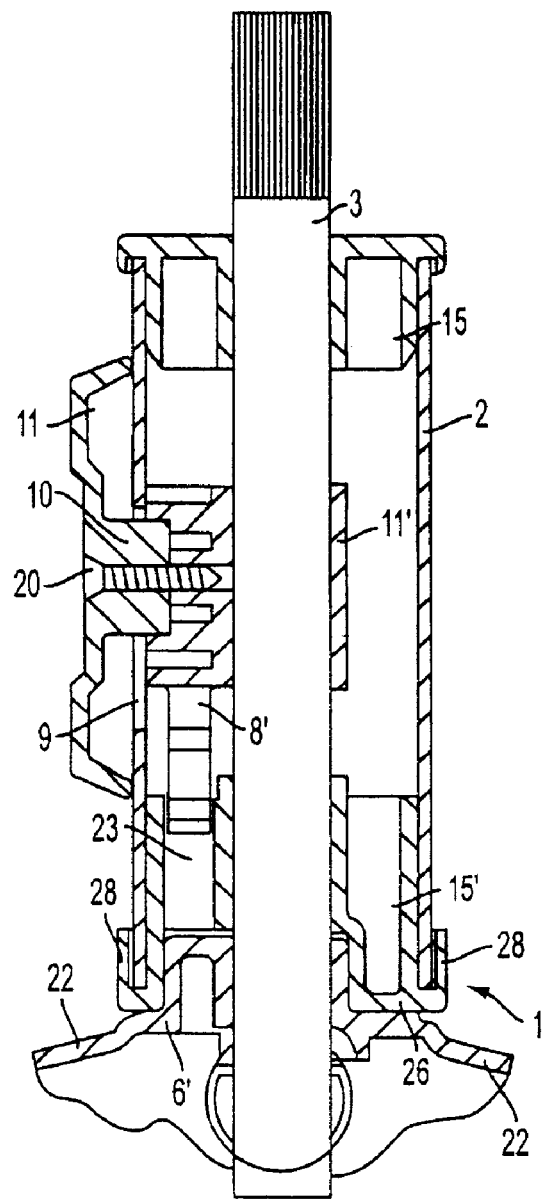
FIG. 8 is a sectional side view of the vehicle steering head according to the invention, in the unlocked state.
Figure 9:
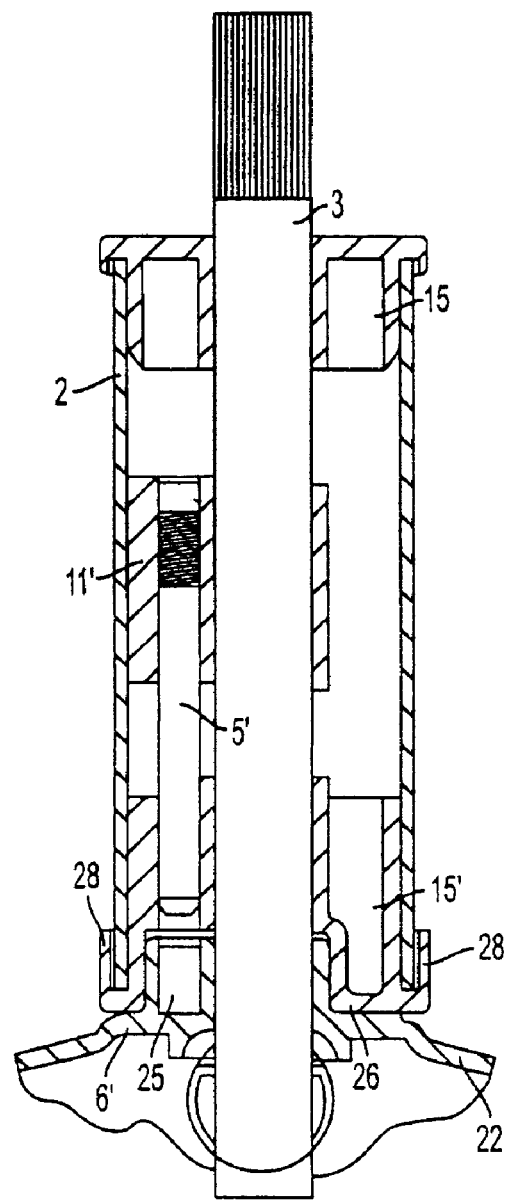
FIG. 9 is a side view, turned or oriented by 90° of the arrangement shown in FIG. 8.
Figure 10:
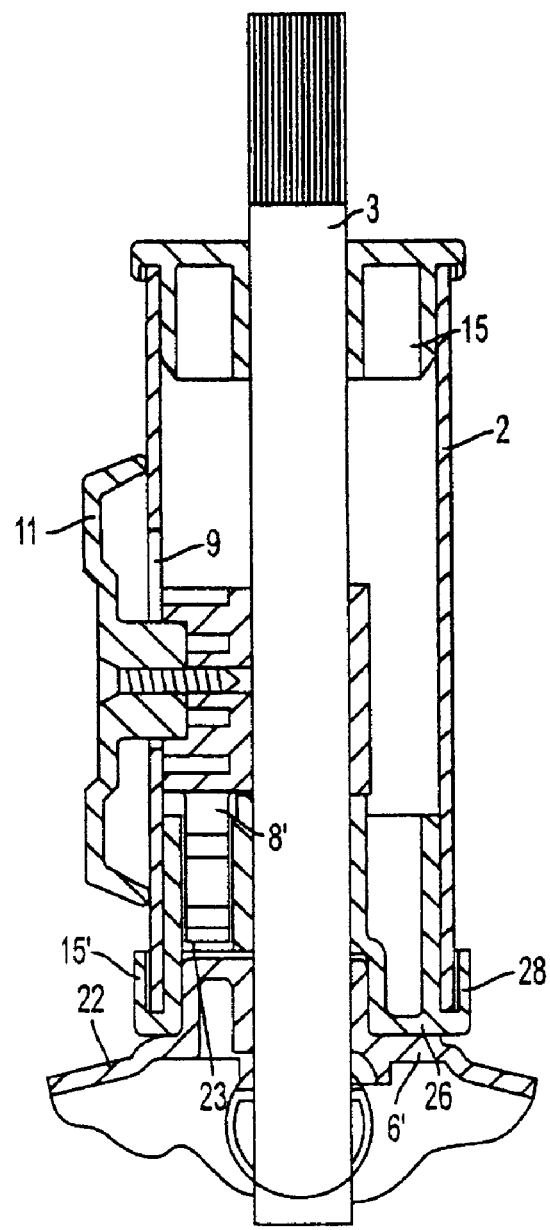
FIG. 10 is a sectional side view similar to FIG. 8, in the locked state.
Figure 11:
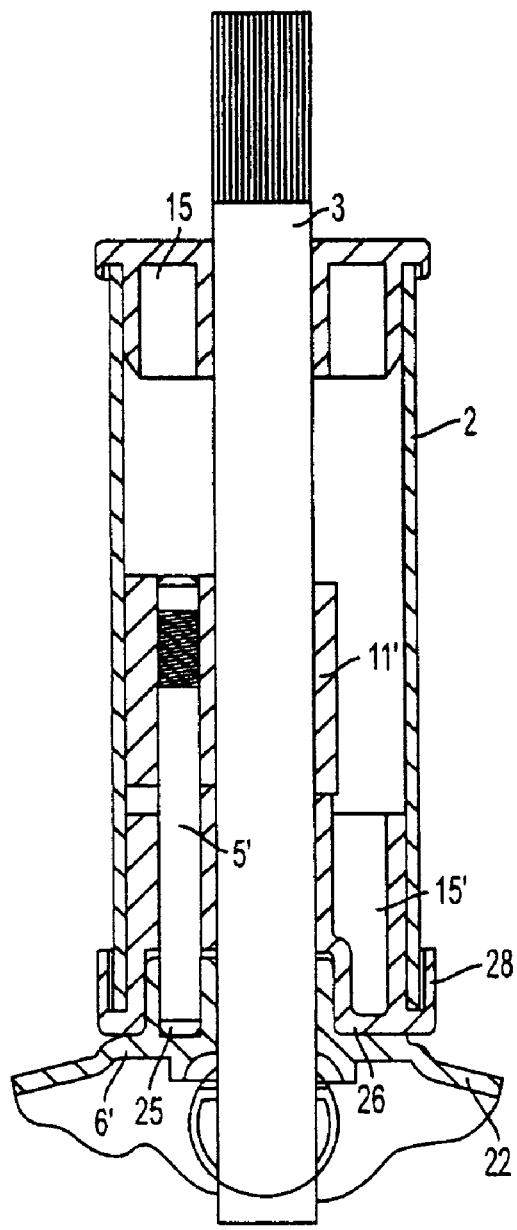
FIG. 11 is a side view, turned or oriented by 90° which is similar to FIG. 9, in the locked state.

As for the description of FIG. 7, reference can be made to the description of FIG. 1 to the extent that the same features are shown. The subsequent figures are illustrations elucidating the details which have been changed.

As in FIGS. 2 to 5, FIGS. 8 and 9 and 10 and 11, respectively, are illustrations showing the vehicle steering head on an enlarged scale. Again, like parts are here also provided with like reference numerals, so that reference can be made to the preceding explanations. Slide 11 utilizes connection element 10 and screw 20. Connection element 10 also extends through a longitudinal slot 9. Moreover, slide 11 comprises an outer grip portion 11 and an interior portion 11' which is screwed to outer grip portion 11 by a screw 20. A top view of slide 11 and 11' is shown in FIG. 16. As can be seen in this figure, a central recess 24 is provided through which fork member 3 extends or passes (with a clearance which allows slide 11' to move up and down with respect to fork member 3). Furthermore, slide 11' also has a recess (see FIGS. 9, 11 and 16) which is formed so that it can accept a bolt-like latch element 5'. Of course, this latch element 5' may be pressed into this recess, threaded into the recess, or otherwise secured to slide 11' in a suitable manner. Alternatively, latch element 5' may be integrally formed with slide 11'.

As already described in conjunction with a previous embodiment, a bearing 15 which serves as a slide bearing is used on the upper portion of steering head 1.

Lower bearing 15' in this embodiment is configured such that it has an upwardly projecting contour of a linkage element 6' which can extend into bearing 15'. Of course, the bearing and the upwardly projecting contour may be made as separate components which are joined together by conventional techniques rather than integrally formed as is shown. Additionally, as becomes apparent in FIG. 12, linkage element 6' may have a recess 25 into which latch element 5' can be inserted (see also FIGS. 9 and 11).

Figure 12:
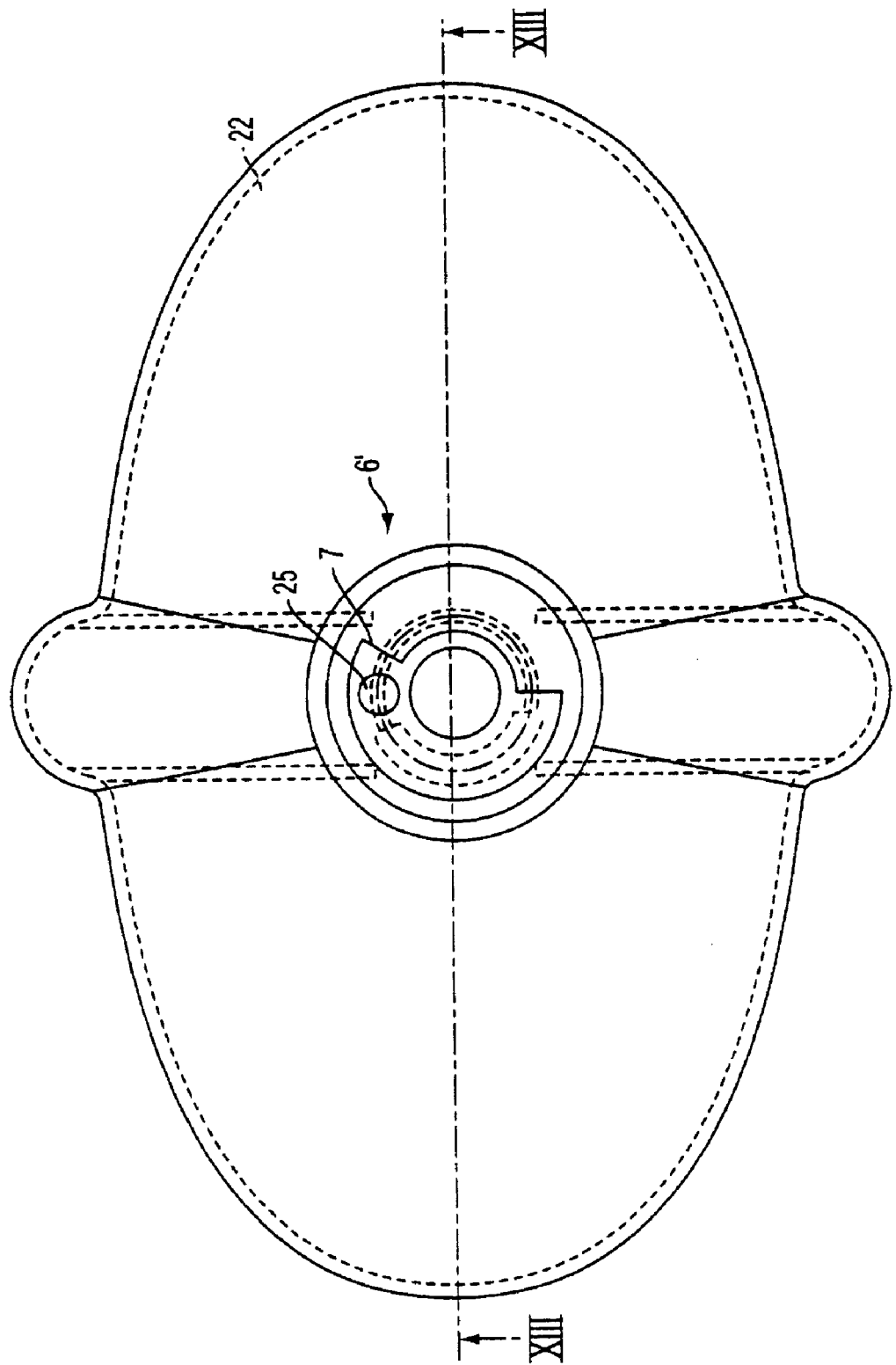
FIG. 12 is a top view on the linkage element according to the invention and on the associated mudguard.

As can further be seen from the top view of FIG. 12, linkage element 6' comprises two lateral stop surfaces 7 which are angularly spaced apart from each other. This design is such that a downwardly oriented attachment or stop 26 (see FIGS. 8 to 11) of the bearing 15', which is connected to support tube 2, forms a steering limitation of plus/minus approximately 45°. Of course, as with the previous embodiment, the range of steering limitation can be designed to any desired range.

FIG. 13 shows a lateral sectional view of mudguard 22 and of linkage element 6'. Note that these components are integrally formed as a single member which reduces manufacturing costs associated with joining two separate components.

FIGS. 14 and 15 are front views of slide 11' wherein handpiece 11 has been removed to illustrate the operation of locking element 8'. Locking element 8' is U-shaped and includes two movable or flexible lateral legs which can releasably be inserted into a recess 23 of bearing 15'. Upon insertion and locking, locking element 8' is pressed against an undercut and thereby held in position inside recess 23. Accordingly, when it is desired to release the locked state of fork member 3, slide 11' must be pushed upwards which removes the legs from recess 23. Of course, other locking mechanisms may be utilized and this embodiment is not limited to the use of this particular locking mechanism. For example, a pin may be used which has a floating ring disposed around its circumference. Alternatively, other conventional releasable locking mechanisms may be utilized.

FIG. 17 is a top view on lower bearing 15' on an enlarged scale. The (downwardly projecting) attachment or stop 26 can be seen here as can recess 23 which receives locking element 8'. Moreover, recess 27 is adapted to receive and guide bolt-like latch element 5' therein. Furthermore, a surrounding collar-like edge 28 can be seen in which 29 designates two oppositely disposed attachments or projections which serve as anti-rotation engagements. These engagements are designed to engage recesses (not shown) of support tube 2. Of course, lower bearing may be secured to support tube 2 in any conventional manner such as by bonding, welding, or screws. Moreover, this attachment may be releasable or more permanent in nature.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A tricycle vehicle steering head comprising:
   a support tube adapted to be fixed to a frame;
   a connecting member adapted to connect a wheel fork to a handlebar;
   a mechanism which limits the rotational movement of the connecting member in each of two directions;
   the mechanism being arranged on a mudguard;
   an upper bearing support mounted to an upper end of the support tube;
   a lower bearing support mounted to a lower end of the support tube,
   the connecting member being rotatably mounted to the support tube via the upper and lower bearing supports; and
   a locking device that engages an opening in the mechanism;
   wherein the mechanism and the lower bearing support cooperate to limit the rotational movement of the connecting member.

2. The steering head of claim 1, wherein the upper and lower bearing supports are each non-rotatably fixed to the support tube.

3. The steering head of claim 1, wherein the lower bearing support comprises at least one stop surface.

4. The steering head of claim 3, wherein the lower bearing support comprises two stop surfaces.

5. The steering head of claim 1, wherein the mechanism comprises at least one stop surface.

6. The steering head of claim 5, wherein the mechanism comprises two stop surfaces.

7. The steering head of claim 1, wherein the mechanism comprises a linkage element having at least one stop surface.

8. The steering head of claim 7, wherein the linkage element rotates with the connecting member.

9. The steering head of claim 7, wherein the linkage element and the mudguard comprise a one-piece structure.

10. The steering head of claim 1, wherein the connecting member is cylindrically shaped.

11. The steering head of claim 1, further comprising a handlebar connected to one end of the connecting member and a wheel fork connected to another end of the connecting member.

12. A tricycle vehicle steering head comprising:
    a support tube adapted to be fixed to a frame;
    a cylindrical member adapted to connect a wheel fork to a handlebar;
    the cylindrical member being rotatable with respect to the support tube;
    a recessed portion arranged at a lower end of the support tube and comprising first and second stop surfaces;
    an arcuate projecting portion configured to rotate within the recessed portion and comprising first and second stop surfaces; and
    an arc length of the arcuate protecting portion being greater than 180 degrees between the first and second stop surfaces,
    wherein contact between the first stop surfaces of the projecting portion and the recessed portion limits the rotation of the cylindrical member in one direction, and
    wherein contact between the second stop surfaces of the projecting portion and the recessed portion limits the rotation of the cylindrical member in another direction.

13. The steering head of claim 12,
    wherein the arcuate projecting portion rotates with the cylindrical member; and
    wherein a lower bearing support includes the recessed portion.

14. The steering head of claim 12, wherein the arcuate projecting portion is coupled to a mudguard.

15. A tricycle vehicle steering head comprising:
    a support tube adapted to be fixed to a frame;
    a connecting element adapted to connect a wheel fork to a handlebar;
    the connecting element being rotatably mounted to the support tube via upper and lower bearing supports;

a rotatably mounted linkage element comprising at least two stop surfaces and an opening;
the linkage element engaging the lower bearing support;
a mudguard that rotates with the linkage element;
a movably mounted pin that engages the opening in the linkage element in a locking position and that does not engage the opening in the linkage element in a unlocked position:
one of the at least two stop surfaces limiting the rotation of the connecting element in one direction; and
another of the at least two stop surfaces limiting the rotation of the connecting element in another direction.

16. A tricycle vehicle steering head comprising:
a support tube adapted to be fixed to a frame;
a connecting member adapted to connect a wheel fork to a handlebar;
the connecting element being rotatably mounted to the support tube via upper and lower bearing supports;
a locking device that, in a locked position, prevents rotational movement of the fork member and that, in an unlocked position, allows rotational movement of the fork member in each of two directions;
a system which is arranged at a lower end of the support tube and that limits the rotational movement of the fork member in each of the two directions,
wherein the system includes an arcuate projecting part and a recessed part which is configured to receive the arcuate projecting part, and
wherein the recessed part is non-rotatably mounted and wherein the arcuate projecting part rotates with the connecting member.

17. A tricycle vehicle steering head comprising:
a support tube adapted to be fixed to a frame;
a connecting element adapted to connect a wheel fork to a handlebar;
the connecting element being rotatably mounted to the support tube via upper and lower bearing supports;
a mechanism that is rotatable and comprises an opening and at least two stop surfaces arranged on an arcuate projecting portion;
the mechanism engaging with the lower bearing support;
a movably mounted pin that, in a locking position, engages with the opening in the mechanism;
one of the at least two stop surfaces limiting the rotation of the connecting element in one direction; and
another of the at least two stop surfaces limiting the rotation of the connecting element in another direction.

18. The vehicle steering head of claim 17, the mechanism is arranged on a mudguard.

19. The vehicle steering head of claim 18, wherein the movably mounted pin moves parallel to an axis of the connecting element.

20. The vehicle steering head of claim 17, wherein the lower bearing support comprises at least two stop surfaces that are engagable with the at least two stop surfaces of the arcuate projecting portion.

21. A tricycle vehicle steering head comprising:
a support tube adapted to be fixed to a frame;
a connecting element adapted to connect a wheel fork to a handlebar;
the connecting element being rotatable with respect to the support tube;
a movable locking member which engages with an opening to prevent rotational movement of the connecting element and which disengages from the opening to allow rotational movement of the connecting element;
a first stop surface limiting the rotation of the connecting element in one direction; and
a second stop surface limiting the rotation of the connecting element in another direction,
wherein the opening, the first stop surface and the second stop surface are each arranged on a mudguard.

22. The vehicle steering head of claim 21, wherein the first and second stop surfaces rotate with the mudguard.

23. The vehicle steering head of claim 21, wherein the first and second stop surfaces are disposed on an arcuate projecting portion of the mudguard.

24. The vehicle steering head of claim 21, wherein the opening rotates with the connecting element.

25. The vehicle steering head of claim 21, wherein the movable locking member comprises a pin.

26. The vehicle steering head of claim 21, wherein the first and second stop surfaces moveably engage two stop surfaces which do not move.

27. The vehicle steering head of claim 21, further comprising a lower bearing support that comprises the two stop surfaces which do not move, wherein the two stop surfaces which do not move engage the first and second stop surfaces.

28. A tricycle vehicle steering head comprising:
a support tube adapted to be fixed to a frame;
a connecting member adapted to connect a wheel fork to a handlebar;
the connecting member being rotatable with respect to the support tube; and
a system which limits the rotational movement of the fork member in each of two directions;
the system including one part which is non-rotatably mounted to an end of the support tube and another part which rotates with the connecting member;
a pin that engages, in a locking position, an opening in the other part,
wherein the other part is an arcuate projection and the one part is an arcuate guiding recess within which the arcuate projection moves.

29. A tricycle vehicle steering head comprising:
a support tube adapted to be fixed to a frame;
a cylindrical member adapted to connect a wheel fork to a handlebar;
the cylindrical member being rotatably mounted to the support tube; and
a system which limits the rotational movement of the cylindrical member in each of two directions, the system including one part which is non-rotatably mounted to the support tube and another part which rotates with the cylindrical member;
a locking system comprising a pin and an opening configured to receive the pin;
the pin being configured to move in a direction which is parallel to an axis of the support tube; and
the opening being arranged on the other part and being configured to rotate with the cylindrical member,
wherein, when the pin engages the opening, the cylindrical member is prevented from rotating, and
wherein when the pin does not engage the opening, the cylindrical member is free to rotate in each of two directions.

30. A tricycle vehicle steering head coupled to a frame, said steering head comprising:
a support tube adapted to be fixed to the frame;
a lower bearing support non-movably mounted to the support tube;
a connecting element adapted to connect a wheel fork to a handlebar;

the connecting element being rotatable with respect to the support tube;

a mechanism that limits rotational movement of the connecting element;

the mechanism comprising at least two stop surfaces which engage with first and second stop surfaces of the lower bearing support;

one of the at least two stop surfaces limiting the rotation of the connecting element in one direction; and another of the at least two stop surfaces limiting the rotation of the connecting element in another direction, wherein the mechanism comprises an arcuate projection, an arc length of the arcuate projection between the at least two stop surfaces being greater than an arc length of a space defined by the at least two stop surfaces, whereby the arcuate projection and the space comprise an arc length equal to a circle.

31. The vehicle steering head of claim 30, wherein the mechanism is coupled to a mudguard.

32. The vehicle steering head of claim 30, further comprising a device that engages the mechanism to prevent movement thereof.

33. The vehicle steering head of claim 32, wherein the device that engages the mechanism comprises a pin.

34. A tricycle vehicle steering head coupled to a frame, comprising:
a support tube fixed to the frame;
a connecting element adapted to connect a wheel fork to a handlebar;
the connecting element being configured to rotate with respect to the support tube;
a mechanism that limits rotational movement of the connecting element;
the mechanism comprising at least two stop surfaces;
one of the at least two stop surfaces limiting the rotation of the connecting element in one direction;
another of the at least two stop surfaces limiting the rotation of the connecting element in another direction; and
a locking system that prevents rotational movement of the connecting element,
the locking system comprising a movable engaging member and an opening that can receive the engaging member and which can rotate with the connecting element,
wherein the opening is arranged on the mechanism.

35. The vehicle steering head of claim 34, wherein the engaging member can move between a first position that allows the connecting element to rotate in each of two directions and a second position wherein the connecting element is prevented from rotational movement in each of the two directions.

36. The vehicle steering head of claim 34, wherein the engaging member can move from a first position to a second position, wherein, in the first position, the connecting element can rotate in each of two directions and wherein, in the second position, the engaging member enters the opening and the connecting element is prevented from rotational movement in each of the two directions.

37. A tricycle vehicle steering head comprising:
a support tube adapted to be fixed to a frame;
a connecting member rotatably mounted to the support tube;
a mechanism that limits rotational movement of the connecting member in each of two directions;
the mechanism comprising at least two stop surfaces;
one of the at least two stop surfaces limiting the rotation of the connecting member in one direction;
another of the at least two stop surfaces limiting the rotation of the connecting member in another direction; and
a locking system which utilizes a movable locking member and an opening;
wherein, when the locking member does not engage the opening, the connecting member can rotate in each of the two directions, and wherein, when the locking member engages the opening, the connecting member is prevented from rotating in each of the two directions.

38. The vehicle steering head of claim 37, further comprising a mudguard.

39. The vehicle steering head of claim 37, wherein the locking member moves in a direction that is parallel to an axis of the connecting member.

40. The vehicle steering head of claim 37, wherein the connecting member is mounted to the support tube via upper and lower bearing supports.

41. The vehicle steering head of claim 37, wherein the mechanism moves when the connecting member moves.

42. A tricycle vehicle steering head comprising:
a support tube adapted to be fixed to a frame;
a connecting element rotatably mounted to the support tube via upper and lower bearing supports;
a mudguard;
a system which limits the rotational movement of the connecting element in each of two directions;
a locking system comprising a movable locking member and an opening arranged on the mudguard;
wherein, when the locking member does not engage the opening, the connecting element can rotate in each of the two directions, and wherein, when the locking member engages the opening, the connecting element is prevented from rotating in each of the two directions.

43. The vehicle steering head of claim 42, wherein the locking member moves in a direction that is parallel to an axis of the connecting element.

44. The vehicle steering head of claim 42, wherein the mechanism moves when the connecting element moves.

45. A tricycle vehicle steering head comprising:
a support tube adapted to be fixed to a frame;
a fork member rotatably mounted to the support tube via upper and lower bearing supports;
a system which limits the rotational movement of the fork member in each of two directions; and
a locking system comprising a movable locking member and an opening,
wherein the locking member moves in a direction that is parallel to an axis of the support tube, and
wherein, when the locking member does not engage the opening, the fork member can rotate in each of the two directions, and wherein, when the locking member engages the opening, the fork member is prevented from rotating in each of the two directions.

46. The vehicle steering head of claim 45, wherein the locking member comprises a pin.

47. A tricycle vehicle steering head comprising:
a support tube adapted to be fixed to a frame;
a fork member rotatably mounted to the support tube;
a mudguard;
a locking system comprising a pin and an opening configured to receive the pin;
the pin being movably mounted; and
the opening being arranged on a surface of the mudguard;

wherein, when the pin engages the opening, the fork member is prevented from rotating, and wherein, when the pin does not engage the opening, the fork member is free to rotate in each of two directions.

48. The vehicle steering head of claim 47, wherein the pin can move in a direction that is parallel to an axis of the support tube.

49. The vehicle steering head of claim 47, further comprising a system which limits the rotational movement of the fork member in each of the two directions.

50. The vehicle steering head of claim 47, wherein the fork member can rotate approximately 45 degrees in each of the two directions.

51. A vehicle steering head for a tricycle having a frame, the vehicle steering head comprising:
- a support tube fixed to the frame of the tricycle;
- an upper bearing support mounted to the support tube;
- a lower bearing support mounted to the support tube;
- a connecting element rotatably mounted to the support tube via the upper and lower bearing supports;
- a mudguard; and
- a movement limiting system that limits rotational movement of the connecting element in each of two directions,
- wherein the movement limiting system comprises an arcuate recess and an arcuate projection, the arcuate projection having an arc length between two stop surfaces that is
- greater and an arc length of a space defined by the two stop surfaces of the arcuate projection, whereby the arcuate projection and the space comprise an arc length equal to a circle, and the arcuate recess having an arc length between two other stop surfaces that is greater than the arc length of the arcuate projection.

52. A vehicle steering head for a tricycle having a frame, the vehicle steering head comprising:
- a support tube fixed to the frame of the tricycle;
- an upper bearing support mounted to the support tube;
- a lower bearing support mounted to the support tube;
- a connecting element rotatably mounted to the support tube via the upper and lower bearing supports;
- a mechanism which limits rotational movement of the connecting element; and
- a locking system which cooperates with the lower bearing support and which can be moved by a user,
- wherein, when moved to one position, the locking system is structured and arranged to prevent the connecting element from rotating in each of the two directions, and wherein, when moved to another position, the locking system is structured and arranged to allow the connecting element to rotate in each of the two directions.

53. A vehicle steering head for a tricycle having a frame, the vehicle steering head comprising:
- a support tube fixed to the frame of the tricycle;
- an upper bearing support mounted to the support tube;
- a lower bearing support mounted to the support tube;
- a connecting element rotatably mounted to the support tube via the upper and lower bearing supports;
- a mudguard comprising a mechanism for limiting rotational movement of the connecting element and an opening; and
- a locking system which can be moved by a user to engage the opening,
- wherein, when moved to one position, the locking system is structured and arranged to prevent the connecting element from rotating in each of the two directions, and wherein, when moved to another position, the locking system is structured and arranged to allow the connecting element to rotate in each of the two directions.

54. A vehicle steering head for a tricycle having a frame, the vehicle steering head comprising:
- a support tube fixed to the frame of the tricycle;
- an upper bearing support mounted to the support tube;
- a lower bearing support mounted to the support tube;
- a connecting element rotatably mounted to the support tube via the upper and lower bearing supports;
- a mudguard;
- a movement limiting system that limits rotational movement of the connecting
- element in each of two directions;
- the movement limiting system comprising one part arranged on the mudguard and another part arranged on the lower bearing support; and
- a locking system which can be moved by a user,
- wherein, when moved to one position, the locking system is structured and arranged to prevent the connecting element from rotating in each of the two directions, and wherein, when moved to another position, the locking system is structured and arranged to allow the connecting element to rotate in each of the two directions.

55. A vehicle steering head for a tricycle having a frame, the vehicle steering head comprising:
- a support tube fixed to the frame of the tricycle;
- an upper bearing support mounted to the support tube;
- a lower bearing support mounted to the support tube;
- a connecting element rotatably mounted to the support tube via the upper and lower bearing supports;
- a mudguard;
- a locking system comprising a pin and an opening arranged on the mudguard; and
- a movement limiting system that limits rotational movement of the connecting element in each of two directions,
- the movement limiting system comprising an arcuate recess arranged on the lower bearing support and an arcuate projection arranged on the mudguard,
- wherein the arcuate projection has an arc length between two stop surfaces that is greater and an arc length of a space defined by the two stop surfaces of the arcuate projection, whereby the arcuate projection and the space comprise an arc length equal to a circle, and
- wherein the arcuate recess has an arc length between two other stop surfaces that is greater than the arc length the arcuate projection.

56. The vehicle steering head of claim 55, further comprising a device for locking the pin in a locking position.

57. The vehicle steering head of claim 56, wherein the device for locking the pin in the locking position engages the lower bearing support.

58. The vehicle steering head of claim 55, wherein the pin moves parallel to an axis of the connecting element.

59. The vehicle steering head of claim 55, wherein the arcuate projection extends from a surface of the mudguard which rotatably engages the lower bearing support.

60. The vehicle steering head of claim 55, wherein the lower bearing support comprises an opening which allows an end of the pin to pass therethrough.

61. The vehicle steering head of claim 55, wherein the arcuate projection and the mudguard comprise a one-piece structure.

62. A vehicle steering head for a tricycle having a frame, the vehicle steering head comprising:
- a support tube fixed to the frame of the tricycle;
- an upper bearing support mounted to the support tube;

a lower bearing support mounted to the support tube;
a connecting element mounted to the support tube via the upper and lower bearing supports;
a wheel fork rotating with respect to the support tube;
a first part comprising stop surfaces;
a second part comprising stop surfaces;
one stop surface of the first part contacting one stop surface of the second part when the wheel fork is rotated in one direction and another stop surface of the first part contacting another stop surface of the second part when the wheel fork is rotated in another direction;
the first part and the second part being structured and arranged to allow rotational movement of the wheel fork in each of two directions while also limiting rotational movement of the wheel fork in each of the two directions within an angular range; and
a locking system which, in a locked position, prevents rotational movement of the wheel fork and which, in an unlocked position, allows the wheel fork to rotate in each of the
two directions within the angular range.

63. The vehicle steering head of claim 62, wherein the first part comprises a projecting part and the second part comprises a recess which receives therein the projecting part.

64. The vehicle steering head of claim 62, wherein the locking system comprises a movable first member and a second member that receives therein an end of the movable first member.

65. The vehicle steering head of claim 64, wherein the movable first member moves parallel to an axis of the connecting member and the second member comprises an opening.

66. The vehicle steering head of claim 62, wherein each of the first part and the second part are arcuate-shaped.

67. The vehicle steering head of claim 66, wherein the first part has an arc length between the stop surfaces that is greater and an arc length of a space defined by the stop surfaces of the first part, whereby the first part and the space comprise an arc length equal to a circle, and wherein the second part has an arc length between the stop surfaces of the second part that is greater than the arc length the first part.

68. The vehicle steering head of claim 62, further comprising a mudguard, wherein the first part is arranged on the mudguard and the second part is arranged on the lower bearing support.

69. The vehicle steering head of claim 62, wherein the locking system comprises a pin and an opening that receives therein an end of the pin in the locked position.

70. The vehicle steering head of claim 62, wherein the locking system comprises a device that is movably mounted and an opening that, in the locked position,
receives therein an end of the device.

71. The vehicle steering head of claim 62, wherein the locking system comprises one part having an opening which receives therein the connecting element and another part having an opening which, in the locked position, receives therein a portion of the one part.

* * * * *